United States Patent
Cucerzan et al.

(10) Patent No.: US 7,254,774 B2
(45) Date of Patent: Aug. 7, 2007

(54) SYSTEMS AND METHODS FOR IMPROVED SPELL CHECKING

(75) Inventors: Silviu-Petru Cucerzan, Redmond, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 10/801,968

(22) Filed: Mar. 16, 2004

(65) Prior Publication Data

US 2005/0210383 A1    Sep. 22, 2005

(51) Int. Cl.
G06F 17/24    (2006.01)
G06F 17/27    (2006.01)

(52) U.S. Cl. ....................................... 715/533
(58) Field of Classification Search ................ 715/533, 715/532; 707/3, 5
See application file for complete search history.

(56) References Cited

U.S. PATENT DOCUMENTS

| | | | |
|---|---|---|---|
| 5,258,909 A | | 11/1993 | Damerau et al. |
| 5,659,771 A | * | 8/1997 | Golding ........................ 715/533 |
| 5,715,469 A | | 2/1998 | Arning |
| 5,754,939 A | * | 5/1998 | Herz et al. ................... 453/3.04 |
| 5,875,443 A | * | 2/1999 | Nielsen ........................... 707/2 |
| 5,892,919 A | * | 4/1999 | Nielsen ........................ 709/228 |
| 6,047,300 A | | 4/2000 | Walfish et al. |
| 6,081,774 A | * | 6/2000 | de Hita et al. .................... 704/9 |
| 6,272,456 B1 | * | 8/2001 | de Campos ..................... 704/8 |
| 6,616,704 B1 | * | 9/2003 | Birman et al. ............... 715/533 |
| 6,636,849 B1 | * | 10/2003 | Tang et al. ..................... 707/6 |
| 6,684,201 B1 | | 1/2004 | Brill |
| 6,701,309 B1 | * | 3/2004 | Beeferman et al. ............. 707/3 |
| 6,853,993 B2 | * | 2/2005 | Ortega et al. ................... 707/5 |
| 2003/0033288 A1 | * | 2/2003 | Shanahan et al. ............... 707/3 |
| 2003/0037077 A1 | | 2/2003 | Brill et al. |
| 2004/0002994 A1 | | 1/2004 | Brill et al. |

OTHER PUBLICATIONS

Srihari et al , Integrating Diverse Knowledge Sources in Text Recognition, ACM, vol. 1, Jan. 1983, pp. 68-75.*

(Continued)

Primary Examiner—Stephen Hong
Assistant Examiner—Wilson Tsui
(74) Attorney, Agent, or Firm—Amin, Turocy & Calvin, LLP

(57) ABSTRACT

The present invention leverages iterative transformations of search query strings along with statistics extracted from search query logs and/or web data to provide possible alternative spellings for the search query strings. This provides for spell checking that can be influenced to provide individualized suggestions for each user. By utilizing search query logs, the present invention can account for substrings not found in a lexicon but still acceptable as a search query of interest. This allows for a higher quality proposal for alternative spellings, beyond the content of the lexicon. One instance of the present invention operates at a substring level by utilizing word unigram and/or bigram statistics extracted from query logs combined with an iterative search. This provides substantially better spelling alternatives for a given query than employing only substring matching. Other instances can receive input data from sources other than a search query input.

36 Claims, 10 Drawing Sheets

OTHER PUBLICATIONS

Hitachi, Derwent, Feb. 15, 2001, p. 1.*
Srihari, Integrating Diverse Knowledge Sources in Text Recognition, ACM, vol. 1, Jan. 1983, pp. 75-77.*
U.S. Appl. No. 09/681,771, filed Jun. 2, 2001, Brill et al.
Ruch, Information Retrieval and Spelling Correction: an Inquiry into Lexical Disambiguation. Proceedings of the 2002 ACM Symposium on Applied Computing, pp. 699-703, 2002.
Brill, An Improved Error Model for Noisy Channel Spelling Correction. In Proc. of the 2000 Association for Computational Linguistics Confernece, 2000. 8 pages.
Mangu, et al., Automatic rule acquisition for spelling correction. In Proc. 14th International Conference on Machine Learning, 1997, 8 pages.
Mays, et al., Context Based Spelling Correction, Information Processing and Management, vol. 27, No. 5, pp. 517-522, 1991.
Damerau, A Technique for Computer Detection and Correction of Spelling Errors, Information Retrieval, Communication sof the ACM, vol. 7, No. 3, Mar. 1964.
Church, et al., Probability Scoring for Spelling Correction, Statistics and Computing 1, pp. 93-103, 1991.

* cited by examiner

SYSTEMS AND METHODS FOR IMPROVED SPELL CHECKING

TECHNICAL FIELD

The present invention relates generally to spell checkers, and more particularly to systems and methods for improving spell checking via utilization of query logs.

BACKGROUND OF THE INVENTION

Interaction with automated programs, systems, and services, has become a routine part of most people's lives—especially with the advent of the Internet. Web surfing or browsing for instance may even be the "new" national pastime for a certain segment of the population. In accordance with such systems, applications such as word processing have helped many become more efficient in their respective jobs or with their personal lives such as typing a letter or e-mail to a friend. Many automated features have been added to these applications such as tools for formatting documents in substantially any desired font, color, shape, or form. One tool that has been appreciated and well received by many users is a spell checking application that is either invoked by a user from the word processor to check all or portions of a respective document and/or invoked to run in the background to check spelling as users are typing. Generally, in order to perform accurate spell checking, a dictionary of "valid strings" may be employed by the spell checking application. If a spell checker encounters a string not in the dictionary, it may hypothesize that the string is a spelling error and attempt to find the "closest" string in the dictionary for the misspelled string. Most spell checkers provide a list of possible matches to the user, whereby if the match is on the list, the user can select the word having the corrected spelling from the list. Other spell checking features may perform automatic corrections—if so configured by the user.

Spell checking for word processing, however, presents only a partial view of potential areas that may be applicable to assist users when entering information into a file or document. For example, with all the potential web sites and services available, users often navigate between sites by explicitly typing in all or portions of the site name or by performing searches on words or phrases that appear in the title and the body of a web page. As many have come to find out, if the site information or the search query is entered incorrectly, the cost in time to re-navigate can become quite high. Language processors employed in search engines or other applications often process user queries and may attempt to distinguish actual user commands from incorrectly entered information. As can be appreciated, however, the type of information that may be entered for a query to a search engine may be quite different in structure or form than typically employed in a word processing application. Thus, tools that check words on a somewhat individual and isolated basis in a word processor application may have little or no utility when applied to information generated from general query data.

Browser or other search queries for information present a unique problem for spell checking applications, since the queries often consist of words that may not be found in a standard spell-checking dictionary, such as artist, product, or company names. Another problem is that a word in a query may have been entered incorrectly, but not be spelled incorrectly (for example, "and processors" instead of "amd processors"). Thus, the manner in which people enter text into a type-in line, for example, such as an input box to a search engine, is often very different than typing for word processing. Both what is entered and the types of errors people make with respect to query input are also quite different in nature. Furthermore, web data and search queries are very dynamic in nature, containing a large number of proper nouns; new products, people, institutions, locations, and events become popular every day. As such, a standard dictionary, while suitable for spell checking in the context of word processing, may not be appropriate for type-in-line and search-query spell checking.

A dictionary (i.e., lexicon) is an important component of any spell checker since the information contained therein provides the foundation to determine incorrect spellings. However, for many applications where spell checking is desired (e.g., text input provided to input boxes), a standard dictionary is not optimal for the problem. For instance, to spell check text input to the input box of a search engine, a dictionary should include strings such as "hanging chad" and "Apolo Anton Ohno" in order to check more recent events or information that may be of interest. As can be appreciated, these and a plurality of other type strings would not appear in a standard dictionary. One possible approach is to utilize substring matching techniques on a log of what users are typing into a particular location, such as a search engine or language processor. Unfortunately, a problem with this approach is that the query logs will generally also contain a large number of input errors and return substring matches that are not relevant to a user's desired search.

Additionally, the dictionary utilized for the spell checking and the context of the search are always changing. These dynamic behaviors cannot be accounted for utilizing traditional dictionary and search query processing. For example, if there is currently a popular band called Limp Bizkit, a search for "bizkit pictures" is likely to refer to this band and not a misspelling of "biscuit." If suddenly the band becomes unpopular, and there is a top-selling book on pictures of biscuits, "bizkit pictures" is then more likely a misspelling of "biscuit pictures." Likewise, given a current state of politics, "govenor anld" probably refers to "governor arnold" if he is currently a popular California governor. Thus, the context of the search query impacts the spell checking significantly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to spell checkers, and more particularly to systems and methods for improving spell checking via utilization of query logs. Iterative transformations of search query strings along with statistics extracted from search query logs and/or web data are leveraged to provide possible alternative spellings for the search query strings. This provides a superior spell checking means that can be influenced to provide individualized suggestions for each user. By utilizing search query logs, the present invention can account for substrings not found in a lexicon but still acceptable as a search query of interest. This allows a means to provide a higher quality proposal for alternative spellings, beyond the content of the lexicon. One instance of the present invention operates at a substring level by utilizing word unigram and bigram statistics extracted from query logs along with an iterative search. This provides substantially better spelling alternatives for a given query than employing only exact string matching. Thus, the present invention, for example, can tailor its suggested alternatives based on the recent history of popular concepts/queries. It can also tailor its corrections for a given user based on the corresponding prior query logs, enabling a much more relevant spelling alternative to be provided. Other instances of the present invention can receive input data from sources other than a search query input. This provides a method of utilizing the query log facilitated spell checking in the context of ordinary word processors and the like.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
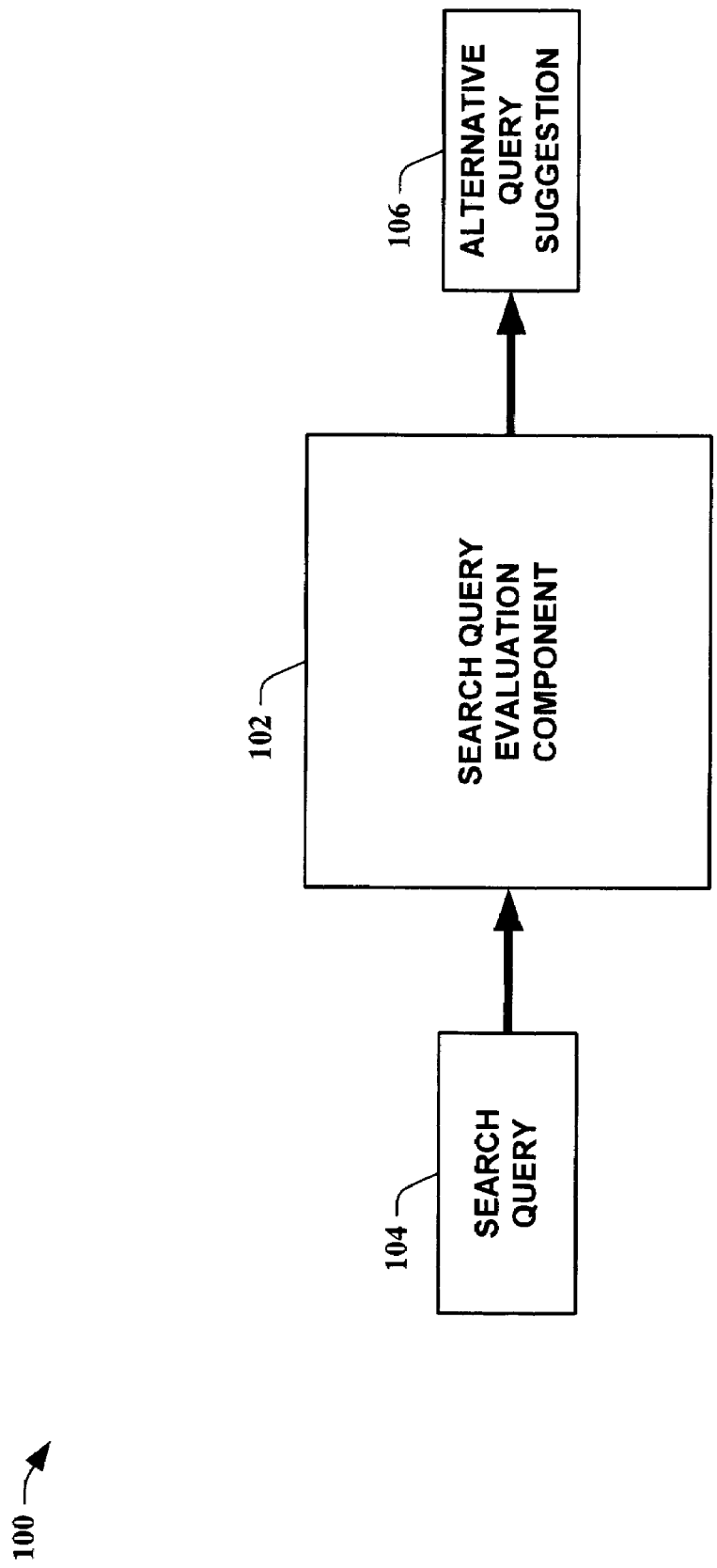
FIG. 1 is a block diagram of a search query evaluation system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides improved systems and methods for spell-checking queries to a search engine. One instance of the present invention utilizes a trusted lexicon (which is a list of valid words in a language) and query logs as sources of data. The present invention operates at a substring level by utilizing word unigram and bigram (with stop word skipping) statistics as extracted from query logs, and, also, an innovative type of iterative search for better spelling alternatives to a given query over employing only string matching. Another instance of the present invention utilizes, at least in part, web statistics for low-count word n-grams (which are defined as sequences of n consecutive words; in particular, unigrams are individual words, bigrams are sequences of two consecutive words).

Traditional spelling-correction of words relies on a trusted lexicon L of the language in which a text is written and a distance function, d. A set of in-lexicon alternative spellings $\{w_1, w_2, \ldots, w_k\}$ is proposed for each out-of-lexicon word form in the text when such valid alternatives exist within a given fixed distance threshold, $\delta$, typically one or two edits away (i.e., $\text{dist}(w, w_i) \leq \delta$). The alternatives are usually ordered by a conditional likelihood function $P(w_i|w)$, which takes into account the probability of a word in the language (usually computed through maximum likelihood estimation from a large corpus in the target language) and the distance between words.

The actual distance function, d, and threshold, $\delta$, are important for the accuracy of a spell checker. On one extreme, the utilization of a too restrictive function/threshold combination can result in not finding the best correction for a given query. On the other extreme, the utilization of a less limiting function might have as the consequence of suggesting very unlikely corrections. The present invention provides a viable compromise, by utilizing a modified limited search for alternatives at the string level, while not substantially restricting the search of alternatives at the word level. One instance of the present invention utilizes, as a distance to identify the set of alternatives for each word of a string, a context-dependent weighted Levenshtein distance which allows insertion, deletion, substitution, immediate transposition, and long-distance movement of letters as basic edits. The threshold itself is variable, depending on the characteristics of each word (mainly, whether a word is in the lexicon or not) and on the iteration number.

In FIG. 1, a block diagram of a search query evaluation system 100 in accordance with an aspect of the present invention is shown. The search query evaluation system 100 is comprised of a search query evaluation component 102.

The search query evaluation component 102 receives a search query input 104 and outputs alternative query suggestion data 106. The search query evaluation component 102 utilizes lexicon as well as search query logs to evaluate each search query. Other instances of the present invention also utilize web statistics to evaluate the search query input 104. Generally, an iterative process is utilized to further refine each alternative suggestion until an optimum suggestion is obtained. The search query logs provide statistical information that the search query evaluation component 102 can leverage to find the best solution for a typical user or a given user. In yet another instance of the present invention, the search query logs are processed such that timing patterns can be employed to facilitate in evaluation of the search query. The timing patterns can be, but are not limited to, time of the year patterns, date patterns (e.g., every Wednesday, holiday, etc.), and time of the day patterns, etc. Thus, an instance of the present invention can obtain query logs for the month of October of the current year and the month of October for the preceding year. This type of time pattern recognition can facilitate in producing better search query suggestion data 106. Likewise, other types of pattern recognitions can be utilized by the present invention, such as, for example, search patterns of the user, hobbies and interests of the user, preferences of the user, etc. Search query logs and/or web data can be obtained by the present invention related to these particular aspects of a given user to further facilitate search query evaluations.

One skilled in the art will appreciate that the scope of the present invention includes input data derived from sources other than search query inputs. Thus, instances of the present invention can be utilized to accept data inputs from word processors, email programs, instant message programs, and chat room programs, and like. In this manner, the query logs can still be leveraged in environments other than search query programs. Therefore, the various forms of the term "search query" are synonymous with various forms of "input data" when utilized in the context of the present invention. Thus, input data refers to any data being submitted for spell checking purposes to instances of the present invention.

Figure 2:
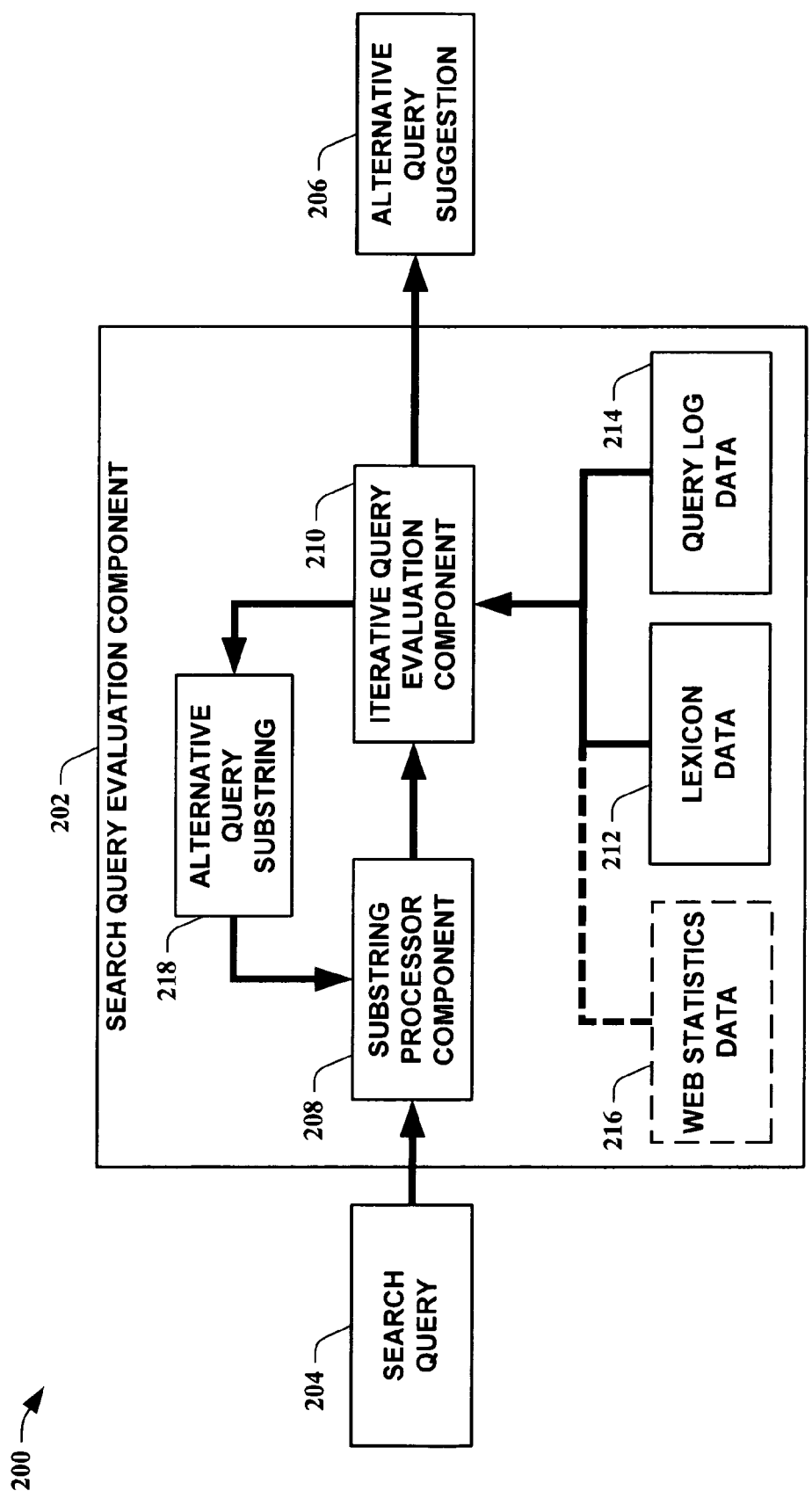
FIG. 2 is another block diagram of a search query evaluation system in accordance with an aspect of the present invention.

Referring to FIG. 2, another block diagram of a search query evaluation system 200 in accordance with an aspect of the present invention is depicted. The search query evaluation system is comprised of a search query evaluation component 202 that receives search query data 204 and outputs alternative query suggestion data 206. The search query evaluation component 202 is comprised of a substring processor component 208 and an iterative query evaluation component 210. The substring processor component 208 receives the search query data 204 and tokenizes it to a level that can be utilized by the iterative query evaluation component 210. The iterative query evaluation component 210 utilizes query log data 214 and can also utilize additional data sources such as lexicon data 212 and/or optional web statistics data 216. This data is leveraged to provide enhanced evaluation of the search query data 204 and is detailed further infra. The iterative query evaluation component 210 processes the tokenized query terms and sends a new set of alternative search query substrings 218 back to the substring processor component 208 for tokenization. This iterative process is continued until the iterative query evaluation component 210 determines that an optimum suggestion has been reached and outputs this information as the alternative query suggestion data 206.

To better appreciate the present invention, it is helpful to understand the context from which it is employed and its purpose. Approximately 10% of the queries sent by users to web search engines are flawed by misspelling errors. Therefore, an important problem in web searching is detecting and correcting the misspelled queries. Spell checking of queries to a search engine is a fundamentally different problem than traditional spell checking of documents (e.g., typical word processor spell checker). A few of the important characteristics of this process that distinguishes it from traditional spelling correction of documents:

- Unlike traditional word spellers, which can propose a set of alternatives to each misspelled word, a web query spell checker may suggest only one spelling alternative for a web query—this means a much higher precision is needed than that which traditional spellers provide.
- Traditional spell checkers employ a trusted lexicon and draw attention to out-of-lexicon words. In web queries, unknown words (according to such a lexicon) may not represent spelling mistakes and they may be valid for web search (e.g., limp bizkit). The list of queried terms is not a fixed target, but is rapidly changing. Also, there are cases when in-lexicon words should be changed to other in-lexicon or even out-of-lexicon words, based on collocational information (e.g., food explorer→ford explorer, limp biz kit→limp bizkit).
- In web searching, misspelled words can be many letter-edits away from the intended word, especially when such words represent names of persons, companies, technologies, or products, to mention just a few.
- Web-query spelling correction can benefit from the existence of query logs, as provided by the present invention, in addition to trusted lexicon and/or corpus data. Such query logs contain important near real-time information about word frequencies, word contexts, and about misspelling errors. Such a resource has not been utilized in traditional spelling.

The present invention formulates the problem of spell correcting web queries as an iterative transformation of the query strings into other strings that represent more and more likely queries according to statistics extracted from web-query logs and web data. The task of general purpose spelling correction has a long history, traditionally focusing on resolving typographical errors such as insertions, deletions, substitutions and transpositions of letters (e.g., McIlroy, M. D.; Development of a Spelling List; In *J-IEEE-TRANS-COMM*, 30(1); 91-99; 1982). Typical spell checkers compute for each unknown word (i.e., which is not found in a trusted lexicon of the language), a small set of in-lexicon alternatives to be proposed as possible corrections. Such systems generally ignore context and only rely on information about in-lexicon word frequencies (as estimated from a large corpus) and the most common mistakes both at word level (e.g., the utilization of acceptible instead of acceptable) and at character level (e.g., the misuse of f instead of ph).

The task of web-query spelling correction with the present invention is different in many respects from traditional spell checking and, thus, poses different challenges. The validity of a query cannot be decided by simple lexicon look-up or by checking its grammaticality. Most web queries consist of one concept or an enumeration of concepts, many times containing legitimate, but out-of-lexicon words. For example, a web-query corrector should be able to suggest the correction lego toys for lego tos, arguably the best possible correction based on information about what other people search for, despite the fact that letter-based error models (such as with typical word processor spell checkers) would predict toss, toes, tops, tons, and togs as more probable alternatives for the misspelling tos and that the word lego might not appear in many English lexicons.

Just defining what a valid web query is represents quite a difficult enterprise. Clearly, a trusted lexicon cannot be solely employed, as many new names and concepts become popular every day, and it would be extremely difficult if not impossible to maintain a high-coverage lexicon. A viable alternative can be to collect and exploit the expertise of millions of people that utilize the web and web search engines. Thus, the validity of a word is given, not by a lexicon, but by its frequency in what people are querying for, similar to Wittgenstein's observation (see, Wittgenstein, L.; Philosophical Investigations; Macmillan, New York, third edition; 1968) that "the meaning of a word is its use in the language." But, such an approach has its own caveats. It would be erroneous to simply extract from web-query logs as valid all those queries whose frequencies are above a certain threshold. For example, the misspelling britny spears is a much more popular query than the correctly spelled, but possibly containing out-of lexicon words, e.g., queries bayesian nets or amd processors. The same applies for counting the number of web documents containing the queried terms. Misspellings of very popular terms have much higher frequencies than perfectly valid, less popular terms.

Many of the errors found in web queries represent context-inappropriate substitutions of valid words (e.g., principal and principle), which cannot be detected by lexicon look-up or based on individual word frequencies. It could be anticipated that Kukich's observation (see, Kukich, K; Techniques for Automatically Correcting Words in Text; In *ACM Computing Surveys*, 24(4):377-439; 1992) that about 25-50% of the errors found in modern documents are actually such substitutions would seem to apply to query log data as well, if not in an even greater measure. Resolving such substitution errors has been the object of various previous NLP (Natural Language Processing) work [e.g., (Golding, A. R.; A Bayesian Hybrid Method for Context-Sensitive Spelling Correction; In *Proceedings of the Workshop on Very Large Corpora*, pages 39-53; 1995); (Golding, A. R. and D. Roth; Applying Winnow to Context-Sensitive Spelling Correction; In *Proceedings of the 13th International Conference on Machine Learning*, pages 182-190; 1996); (Mangu, L. and Brill, E.; Automatic Rule Acquisition for Spelling Correction; In *Proceedings of the 14th International Conference on Machine Learning*, pages 734-741; 1997); and (Cucerzan, S. and Yarowsky, D.; Augmented Mixture Models for Lexical Disambiguation; In *Proceedings of EMNLP* 2002, pages 33-40; 2002)], in the framework of context-sensitive spelling correction (CSSC). Although promising results were obtained (92-95% accuracy), the scope of the previous work was very limited (at most 18 confusion sets with two or three alternatives, e.g., {peace, piece}), and the investigated algorithms heavily relied on the existence of annotated data, utilizing large numbers of contextual features extracted from such data. In the case of web query spelling correction, there exists no annotated data, but a large amount of non-annotated data is available in the form of query logs (which are histograms of the queries sent to a search engine over a period of time). Another characteristic of web queries is that they are very short (on average, 2.2 words) and techniques that utilize a multitude of features based on relatively wide context windows, are difficult to apply. Moreover, the typical data utilized in CSSC could be considered generally free of other context misspellings and substitution errors, which is not a realistic scenario for web queries.

Other content and performance constraints further limit the utilization of computationally intensive algorithms in designing a web-query spelling correction system. For example, in a server-based architecture, such a system has to meet very restrictive time performance requirements, while space requirements could be relaxed. Some of these constraints are provided below, but a thorough analysis of them is not provided. Examples of "classical" spelling correction approaches are briefly analyzed by utilizing a series of formal definitions of the task and presenting concrete examples showing the strengths and the limits corresponding to each situation. The problem is iteratively redefined, starting with an approach purely based on a trusted lexicon and ending with an approach in which the role of the trusted lexicon is greatly diminished. While doing so, concrete forward steps are made in order to provide a workable definition of valid web queries.

Let $\Sigma$ be the alphabet of a language and $L \subset \Sigma^*$ a broad-coverage lexicon of the language. The simplest definition of spelling correction can then be the following:

Given $w \in \Sigma^* \backslash L$, find $w' \in L$ such that $$dist(w, w') = \min_{v \in L} dist(w, v).$$

i.e., for any out-of-lexicon word in a text, find the closest word form in the available lexicon and hypothesize it as the correct spelling alternative. dist can be any string-based function, for example, a ratio between the number of letters two words do not have in common and the number of letters they share. The two most used classes of distances in spelling correction are edit distances, as proposed by Damerau (see, Damerau, F. J.; A Technique for Computer Detection and Correction of Spelling Errors; In *Communications of ACM*, 7(3):171-176; 1964) and Levenshtein (see, Levenshtein, V. I.; Binary Codes Capable of Correcting Deletions, Insertions and Reversals; *Doklady Akademii Nauk SSSR*; 163(4) p 845-848; 1965), and correlation matrix distances (see, Cherkassky, V.; Vassilas, N.; Brodt, G. L.; Wagner, R. A.; and Fisher, M. J.; The String to String Correction Problem; In *Journal of ACM*, 21(1):168-178; 1974). One instance of the present invention employs a modified version of the Damerau-Levenshtein edit distance, as presented in infra.

The preceding formulation does not take into account the frequency of words in a language. A simple solution to this problem is to compute the probability of words in the target language L as maximum likelihood estimates (MLE) over a large corpus C over L. The general-purpose spelling-correction problem can be reformulated as follows:

Given $w \in \Sigma^* \backslash L$, find $w' \in L$ such that $dist(w,w') \leq \delta$ and $$P(w') = \max_{v \in L: dist(w,v) \leq \delta} P(v).$$

In this formulation, all in-lexicon words that are within some "reasonable" distance $\delta$ of the unknown word are considered as good candidates, the best of them being chosen based on its prior probability $P(\cdot)$.

A natural step forward is to use posterior probability as an objective function in a noisy channel model framework (see, Kernighan, M.; Church, K.; and Gale, W.; A Spelling Correction Program Based on a Noisy Channel Model; In *Proceedings of COLING* 1990). The objective function will be the probability of a correction conditioned on the original spelling $P(v|w)$ and will incorporate both the prior probability of words in a language $P(v)$ and the probability of misspelling a word form v as w, P(w|v). For simplicity, all formulations described herein use prior probabilities as an objective function, but in practice, these can be replaced with posterior probabilities.

The formulations considered until now do not take context into account—unknown words are corrected in isolation. This is an issue because context is extremely important for spelling correction in a very large number of cases, as illustrated in the following example:

power crd→power cord video crd→video card

The misspelled word form crd should be corrected to two different words depending on its contexts (Other valid alternatives, such as video cd, exist; these are ignored on purpose as they are not useful for this discussion.). The corrections suggested by a traditional spell checker (e.g., typical word processor spell checker) are identical in both cases: card, cord, crud, curd, cud, in this order. When only one suggestion is allowed (typical in web-query spelling correction), taking always the first suggestion from such lists could produce many errors.

A possible formulation of the problem that takes context into account is the following:

Given $s \in \Sigma^*$, $s=c_l w c_r$, with $w \in \Sigma^* \backslash L$ and $c_{l,cr} \in L^*$, find $w' \in L$ such that $dist(w,w') \leq \delta$ and $$P(c_l w' c_r) = \max_{v \in L: dist(w,v) \leq \delta} P(c_l v c_r).$$

Spaces and other word delimiters are ignored in this formulation for simplicity. The subsequent problem formulations will also ignore word delimiters although word tokenization can be considered an important part of the spelling-correction process.

Traditional spelling-correction systems, based on the above definitions, do not handle substitutions of valid words with other valid words. In the case of web searches, it is important to provide correction suggestions for valid words when the correction is more "meaningful" than the original query, for example:

food explorer→ford explorer golf war→gulf war

The following examples show a combination of the two problems not handled by traditional spelling correctors, context-sensitive correction and valid-word substitutions:

chicken sop→chicken soup sop opera→soap opera

These problems are partially addressed by the task of CSSC, as defined in NLP literature, and which can be formalized as follows:

Given a set of confusable valid word forms in a language $W=\{w_1, w_2, \ldots, w_n\}$ and a string $s=c_l w_i c_r$, choose $w_j \in W$ such that $$P(c_l w_j c_r) = \max_{k=1 \ldots n} P(c_l w_k c_r).$$

As formulated, the task of CSSC is more related to word sense disambiguation (WSD) than to traditional general-purpose spelling correction. Nevertheless, this task can be linked to spelling correction by constructing the set of confusables for each word in the text at the time of spell checking as all words w' with $dist(w,w') \leq \delta$. The generalized problem of phrasal spelling correction can be formulated as follows:

Given $s \in \Sigma^*$, find $s' \in L^*$ such that $dist(s,s') \leq \delta$ and $$P(s') = \max_{t \in L^*: dist(s,t) \leq \delta} P(t).$$

Typically, spelling correction is desirable when $s \notin L^*$ (i.e., at least one of the component words is unknown) but, as shown above, there are frequent cases such as sop opera when sequences of valid word forms should be changed to other sequences of valid word forms. Observe that word boundaries are hidden in this latter formulation, making it more general and allowing it to cover other important spelling errors for web query correction, namely concatenation and splitting. For example:

power point slides→powerpoint slides waltdisney→walt disney chat inspanich→chat in spanish This formulation still does not cover an important class of spelling corrections which has to be handled by a web query spelling correction system, represented by unknown words that are actually valid forms in given contexts (therefore, $s' \notin L^*$), for example:

amd processors→amd processors

A typical word processor highlights amd as a misspelled word and provides correction suggestions such as: mad, amid, am, and, and ad. In the case of web query spelling correction, the system should not suggest a spelling correction, as the above phrase represents a legitimate query, despite the fact that it contains unknown words.

Some even more interesting cases not handled in the latter formulation are those in which valid words should be changed into unknown words (i.e., not in the trusted lexicon), as in the following examples, where two valid words should be concatenated into an unknown word:

gun dam planet→gundam planet limp biz kit→limp bizkit

This leads to an even more general formulation of the spelling-correction problem, as follows:

Given $s \in \Sigma^*$, find $s' \in \Sigma^*$ such that $dist(s,s') \leq \delta$ and $$P(s') = \max_{t \in \Sigma^*: dist(s,t) \leq \delta} P(t).$$

This formulation does not make explicit utilization of a lexicon of the language, although a lexicon may still be utilized in the estimation of the likelihood of strings P(s). This means that, in the case of web-query correction, the actual language in which the queries are written becomes less important than the unannotated query-log training data, from which the probability of strings can be estimated. Therefore, this probability model can be a substitute for a measure of the meaningfulness of strings as web-queries. In this way, an implausible random noun phrase in any of the traditional corpora, such as sad tomatoes (the name of a music band), becomes meaningful in the context of web searching.

Traditional spelling-correction of words relies on a trusted lexicon and a string distance function. The formulations of spelling correction given supra utilized such a string distance and threshold to restrict the space in which alternative spellings are searched. Various previous work has addressed the problem of choosing appropriate string distance functions. One instance of the present invention employs a modified context-dependent weighted Levenshtein distance which allows insertion, deletion, substitution, immediate transposition, and long-distance movement of letters as point changes.

The actual string distance function, d, and threshold, δ, are important for the accuracy of a speller. The utilization of a too restrictive function/threshold combination can result in not finding the best correction for a given query. For example, utilizing a standard Levenshtein distance (defined as the minimum number of point changes required to transform a string into another, where a point change is one of the following operations: insertion of a letter, deletion of a letter, and substitution of one letter with another letter) and a threshold of δ=1, the correction donadl duck→donald duck would not be possible. However, the utilization of a less limiting function might have as a consequence suggestions of very unlikely corrections. For example, utilizing the same classical Levenshtein distance and δ=2 would allow the correction of the string donadl duck, but will also lead to bad corrections such as log wood→dogfood (based on the frequency of the queries as incorporated in P(s)). But, large distance corrections are still desirable in a diversity of situations, for example:

EXAMPLE 1 platnuin rings→platinum rings

EXAMPLE 2 ditroitigers→detroit tigers

In the first example, a typical word processor spell checker might suggest only plantain and plantains as corrections for the misspelled word platnuin. In the second example, the typical word processor spell checker highlights the word ditroitigers as a misspelling but provides no correction suggestion. While a traditional trusted lexicon and corpus approach may not be able to solve this type of problem, it can be addressed with the present invention by utilizing large query logs.

If a misspelling such as ditroitigers is too far from the correct alternative according to a distance and threshold of choice, the correct alternative might not be found in one step. Nevertheless, employing an instance of the present invention, the correct alternative can be reached by allowing intermediate valid corrections steps, such as ditroitigers→detroittigers→detroit tigers. The last formulation of the problem did not explicitly utilize a lexicon of the language. Rather, any substring that appears in the query log utilized for training can be considered a valid correction and can be suggested as an alternative to the current web query based on the relative frequency of the query and the alternative spelling. In fact, opposed to a typical spell checker used by a word processor, an instance of the present invention's base spell checker (a base spell checker of the present invention is a non-iterative system) suggests detroittigers, because this alternative occurs frequently in the query log. On the other hand, detroittigers itself can be corrected to detroit tigers if presented as a stand-alone query to the base spell checker by using similar query-log frequency facts, which is the basis for the present invention's iterative correction approach. Essential to such an approach are three typical properties of the query logs: (1) words in the query logs are misspelled in various ways, from relatively easy-to-correct misspellings to large errors ones, that make the user's intent almost impossible to recognize; (2) the less bad a misspelling the more frequent it is; and (3) the correct spellings tend to be more frequent than the misspellings. An example of statistics for search queries relating to Albert Einstein is shown in Table 1:

TABLE 1

Albert Einstein Queries

| Search Query | Frequency |
| --- | --- |
| albert einstein | 10135 |
| albert einstien | 1320 |
| albert einstine | 221 |
| albert einsten | 53 |
| albert einstein's | 52 |
| albert einsteins | 48 |
| albert einstain | 21 |
| albert einstin | 20 |
| albert eintein | 19 |
| albeart einstein | 17 |
| aolbert einstein | 11 |
| alber einstein | 8 |
| albert einseint | 7 |
| albert einsteirn | 7 |
| albert einsterin | 7 |
| albert eintien | 6 |
| alberto einstein | 6 |
| albrecht einstein | 5 |
| alvert einstein | 5 |

In this context, the spelling correction problem can be given the following iterative formulation:

Given $s_0 \in \Sigma^*$, find a sequence $s_1, s_2, \ldots, s_n \in \Sigma^*$ such that $dist(s_i, s_{i+1}) \leq \delta$ and $$P(s_{i+1}) = \max_{t \in \Sigma^* : dist(s_i, t) \leq \delta} P(t), \forall i \in 0 \ldots n-1, \text{ and}$$

$$P(s_n) = \max_{t \in \Sigma^* : dist(s_n, t) \leq \delta} P(t).$$

An example of correction that can be made by iteratively applying the present invention's base spell checker is:

anol scwartegger→arnold schwarzenegger

| | |
| --- | --- |
| Misspelled query: | anol scwartegger |
| First iteration: | arnold schwartnegger |
| Second iteration: | arnold schwarznegger |
| Third iteration: | arnold schwarzenegger |
| Fourth iteration: | no further correction; thus, the result of the third iteration is output. |

Up to this point, the notion of a string in the formulations given to the spell-checking problem has been underspecified. One possibility, explored by Brill et al. (see, Brill, E.; Chandrasekar, R.; and R. Rounthwaite, R; Spelling Correction System and Method for Phrasal Strings Using Dictionary Looping; U.S. patent application Publication No. US2003/0037077A1; U.S. Patent & Trademark Office Ser. No. 09/681,771), is to consider whole queries as strings to be corrected. Their approach is to build a statistical character error model and map logged queries to other logged queries as corrections based on the agreement of their relative frequencies with the character error model. They iterate this correction process of the query log and finally store each query in the log identified as a misspelling of another query in the log. There are a few major disadvantages of working at the query level. This approach exploits the vast information available in web-query logs, but only covers exact phrase matches that appear in these logs, having a relatively low coverage. A query such as britnet spear inconcert can not be corrected because the correct version of it, britney spears in concert, does not appear in the query log, although substrings of it could be corrected in isolation, for example:

britnet spear→britney spears

The present invention overcomes issues with the above approaches to create an effective method for spell checking of queries. The present invention utilizes the following formulation:

Given $s_0 \in \Sigma^*$, find a sequence $s_1, s_2, \ldots, s^n \in \Sigma^*$, such that for each $i \in 0 \ldots n-1$ there exist the decompositions $s_i = w_{i,0}^1 \ldots w_{i,0}^{l_i}$, $s_{i+1} = w_{i+1,1}^1 \ldots w_{i+1,1}^{l_i}$, where $w_{i,j}^k$ are words or groups of words such that $\text{dist}(w_{i,0}^k, w_{i+1,1}^k) \leq \delta$, $i=0 \ldots n-1$, $k=1 \ldots l_i$ and $$P(s_{i+1}) = \max_{t \in \Sigma^*: \text{dist}(s_i, t) \leq \delta} P(t) \text{ for } i = 0 \ldots n-1, \text{ and}$$

$$P(s_n) = \max_{t \in \Sigma^*: \text{dist}(s_n, t) \leq \delta} P(t).$$

Observe that the length of the string decomposition can vary from one iteration to the next iteration, for example:

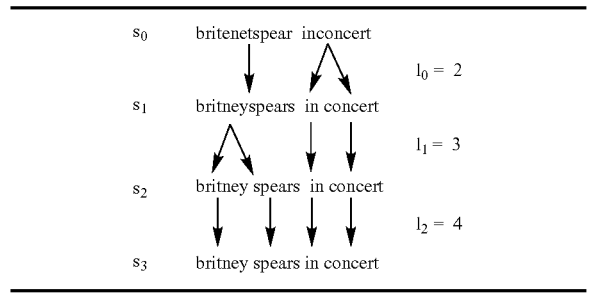

An iterative process is prone to other types of problems. Short queries can be iteratively transformed into other un-related queries; therefore, in one instance of the present invention, changing such queries has additional restrictions. For training, the present invention tokenizes all queries in an employed web query log utilizing very basic space and word-delimiter information in addition to the available lexical information (for example, a lexicon entry such as multimodal will not be split into three parts) and collect unigram and bigram statistics.

An input query is tokenized utilizing the same space and word-delimiter information in addition to the available lexical information as utilized for processing the query log. For each token, a set of alternatives is computed utilizing a string distance function (in one instance of the present invention this is the weighted Levenshtein function described) supra and allowing different thresholds for in-lexicon words and out-of-lexicon tokens. The matches are searched in the space of word/token unigrams and bigrams extracted from query logs in addition to the lexicon. In one instance of the present invention, both unigrams and bigrams are stored in a same data structure, so that a system handles concatenation and splitting of words in exactly the same way it handles one-word unknown forms.

Figure 3:
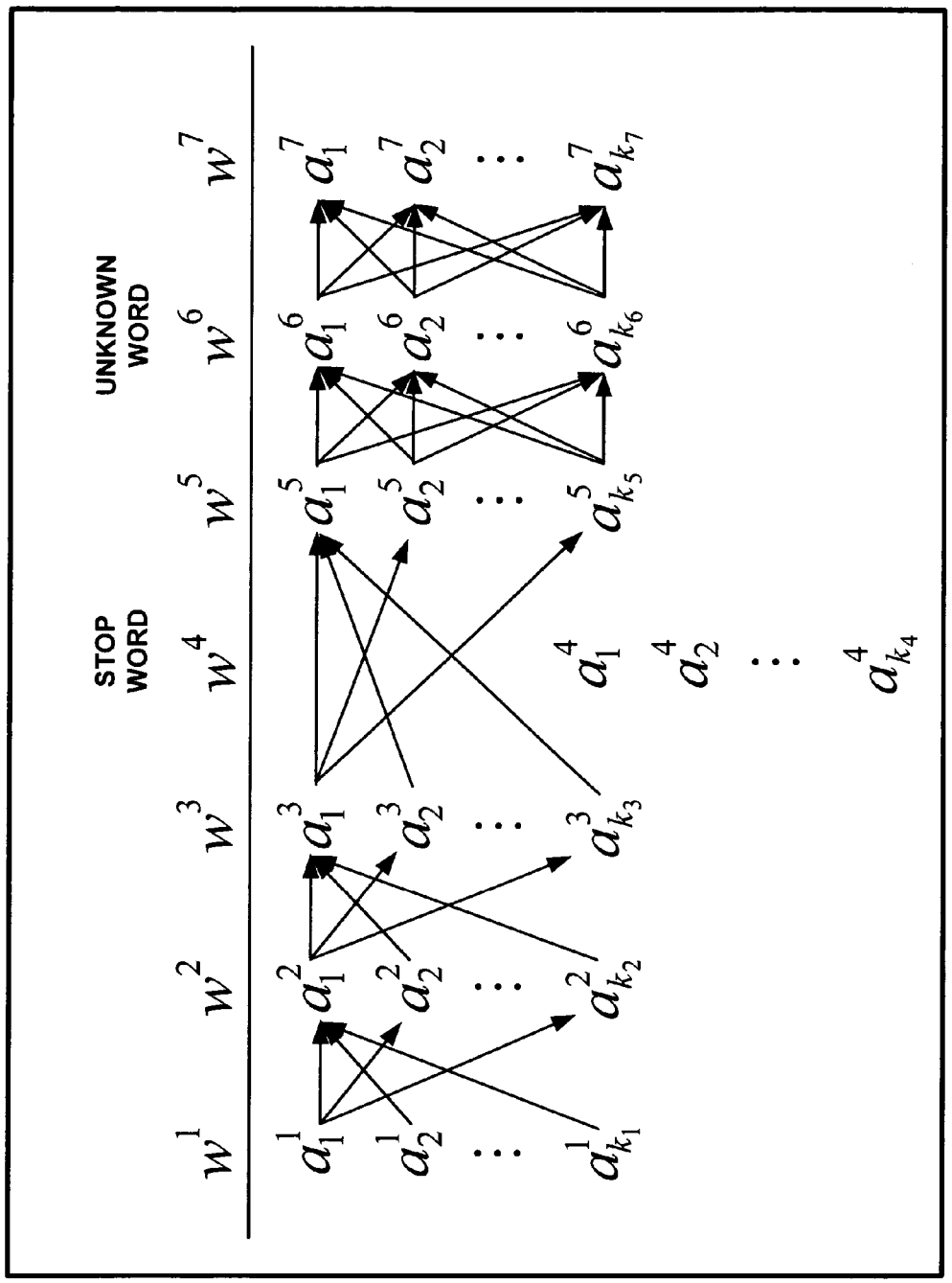
FIG. 3 is an illustration of a search process in accordance with an aspect of the present invention.

Once the sets of all possible alternatives are computed for each word form in the query, a modified Viterbi search (in which the transition probabilities are computed utilizing bigram and unigram query-log statistics and output probabilities are replaced with inverse string distances between words) is employed to find the best possible alternative string to the input query under the following constraint (for example): no two adjacent in-vocabulary words are allowed to change simultaneously. This constraint prevents changes such as log wood→dogfood. An algorithmic consequence of this constraint is that there is no need to search all the possible paths in a trellis (i.e., all possible combinations of correction candidates for every token in a query), which makes the modified search procedure a lot faster, as described further. Assuming that the lists of alternatives for each word are randomly sorted but have the property that if the input word form is in the trusted lexicon then the input word is on the first position in the list, the searched paths form "fringes." FIG. 3, in illustration 300 of a modified Viterbi search, presents such an example of a trellis in which $w^1$, $w^2$, and $w^3$ are presumed in-lexicon word forms. Observe that instead of computing the cost of $k_1 \times k_2$ possible paths between the alternatives corresponding to $w^1$ and $w^2$, it is only necessary to compute the cost of $k_1 + k_2$ paths.

Figure 4:
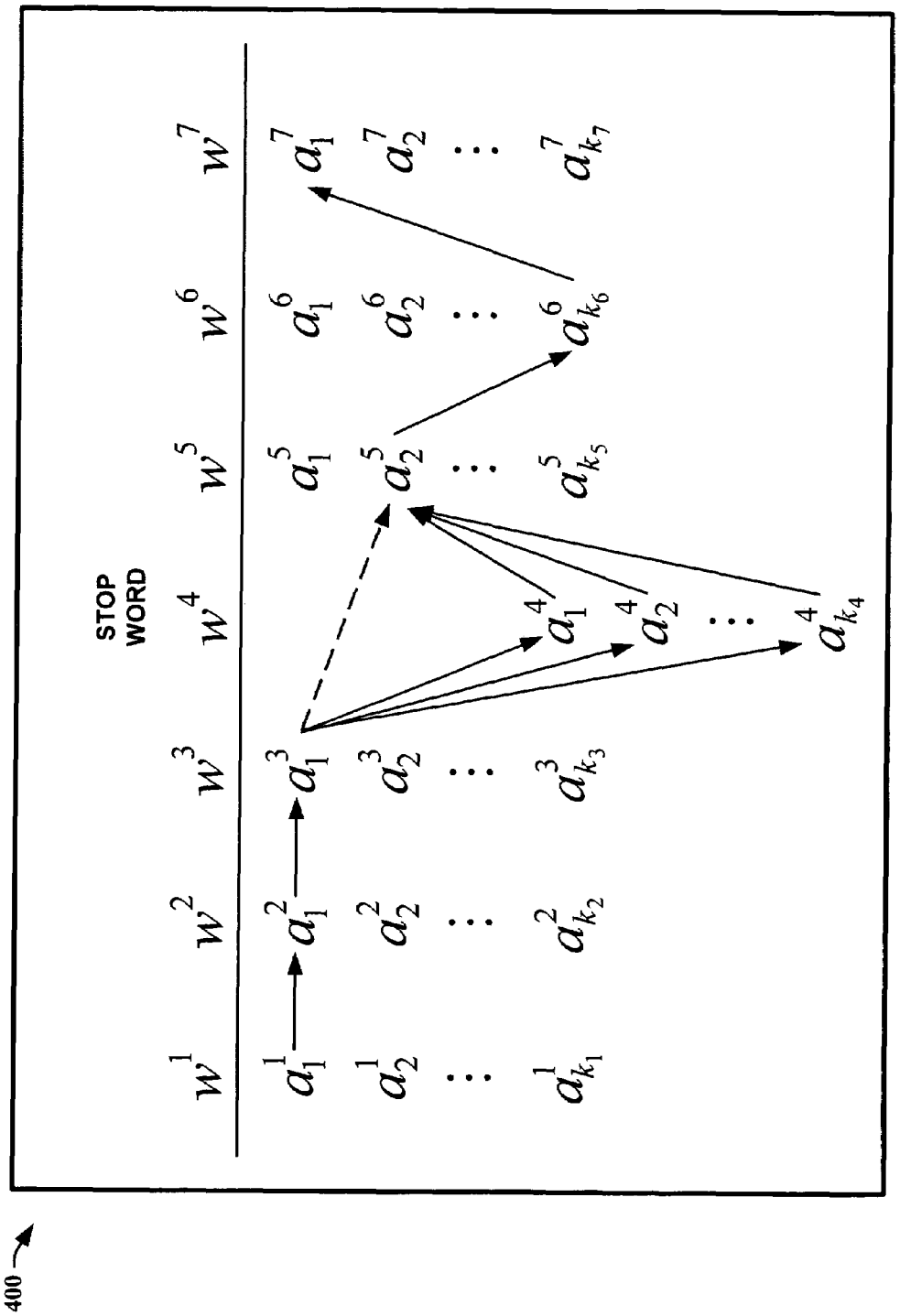
FIG. 4 is another illustration of a search process in accordance with an aspect of the present invention.

Because the present invention employs word-bigram statistics, stop words (such as prepositions and conjunctions) can many times interfere negatively with a best path search. For example, in correcting a query such as platunum and rigs, the language model based on word bigrams would not use a relevant context for the word form rigs. To avoid this type of problem, stop words and their most likely misspellings are treated separately, the search being done by first ignoring them, as in illustration 300, where $w^4$ is presumed to be such a word. Once a best path in the restricted trellis is found, the best alternatives for the stop words (or their misspellings) are computed by a second Viterbi search with fringes in which the extremities are fixed, as presented in illustration 400 of a modified Viterbi search of stop-word treatment in FIG. 4. Although the approach of a search with fringes appears to have a possibly negative impact on the accuracy by restricting the search space too much, such an approach is very powerful when coupled with an iterative process of spelling correction.

The present invention can employ both query logs and web indexes as valuable resources in estimating the probability of n-grams in web queries needed by the proposed Viterbi search with fringes method. However, neither of them can be considered a better resource than the other if utilized in isolation. On one hand, web frequencies may not be very useful for the iterative correction approach, as web document mistakes are less frequent than web query mistakes (approximately 10 to 15% of the web queries contain misspellings) and the mistakes made by web page authors may not model well the mistakes made by the people that query the web. Also, web frequencies may not necessarily reflect the importance of some terms for query spelling correction. As the number of bigrams that appear on the web is much larger than that which a spelling correction system can utilize due to space and speed restrictions, storing and utilizing only bigrams that have a higher count than a given threshold value may not be an optimal. Bigrams with hundreds of occurrences on the web but no occurrences in query logs, such as mail ox, might be less relevant for query correction than word bigrams with lower web counts but that actually appear in query logs, such as ox picture.

Figure 5:
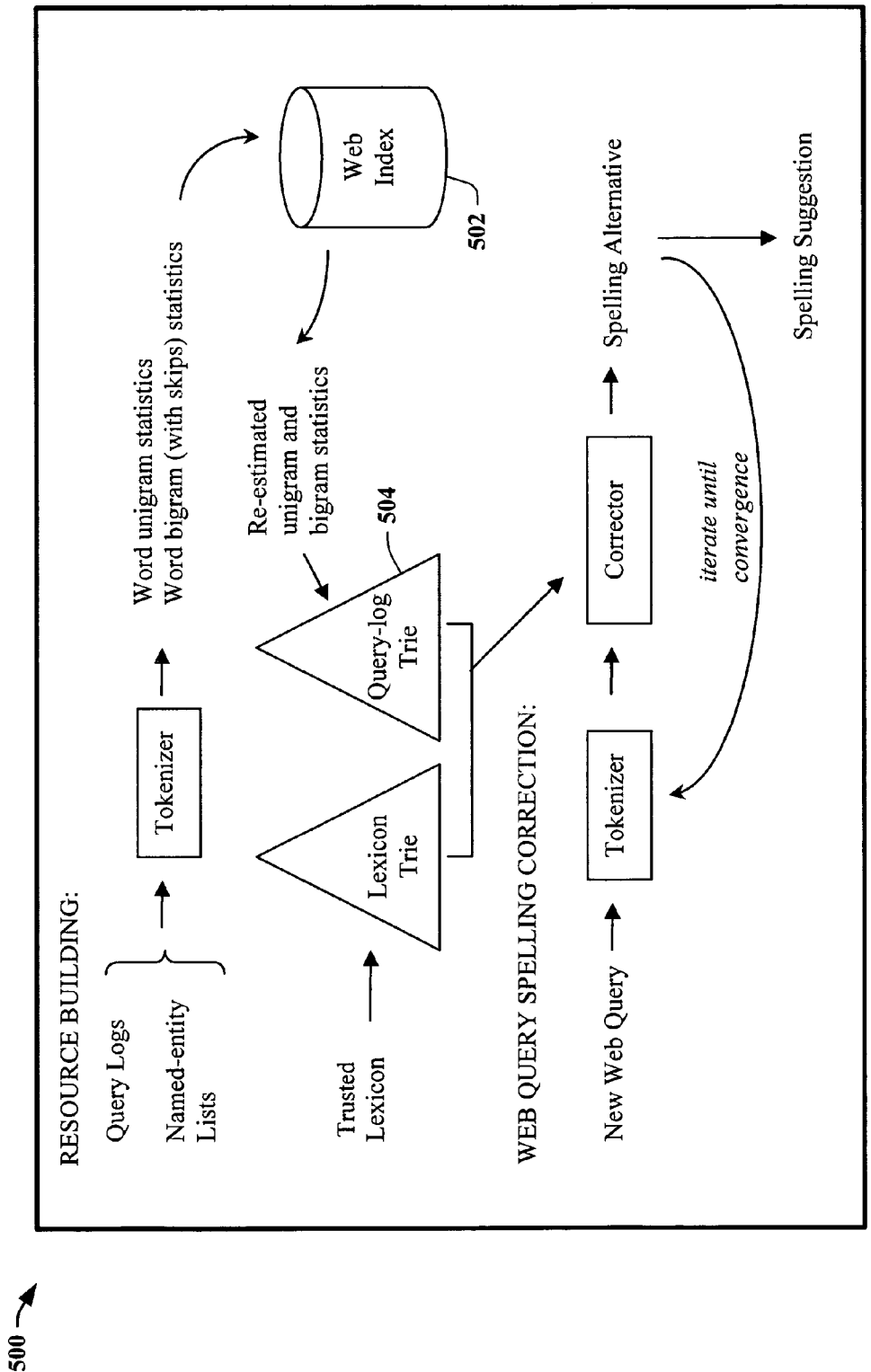
FIG. 5 is an illustration of an information flow structure in accordance with an aspect of the present invention.

On the other hand, query logs can be quite unreliable for low-count unigrams and bigrams. For example, 20 queries in a sample query log contained the bigram catfish soap while only 3 contained the bigram catfish soup. Based on these statistics, a query such as catfish sop would be associated with the incorrect alternative containing the word soap (for simplicity, this example assumes that dist(sop, soap)=dist (sop, soup)). In one instance of the present invention, word unigrams and bigrams that appear in the query logs are employed, but have their query-log frequencies adjusted according to their web frequencies. In this way, very low frequency n-grams can be filtered out from the query log that do not occur on the web (this can be done to limit the size of the data utilized at runtime), but do not lose higher frequency query misspellings that are useful for iterative correction, while obtaining more reliable word n-gram statistics. In FIG. 5, an illustration of an information flow structure 500 in accordance with an aspect of the present invention is shown. The information flow structure 500 depicts a web index 502 being utilized to re-estimate unigram and bigram statistics for a query log trie 504.

In other instances of the present invention, lexicon development can be enhanced by enriching trusted lexicons (especially for languages other than English) by adding to the trusted lexicon words which pass a spelling correction constantly, for example amd:

amd processors→amd processors amd warranty→amd warranty amd overclocking→amd overclocking In yet another instance of the present invention, given an unknown word in the query-log word histogram, the present invention can be utilized to find all queries that contain that word and to compute the number of queries in which the word is corrected versus the number of queries in which the word is left unmodified. In still yet other instances of the present invention, user's knowledge is extracted from query logs by observing how misspellings are corrected with different contexts. Other instances of the present invention include building cognate dictionaries across languages (to be employed as bridging elements in machine translation) and/or employing iterative spelling correctors for facilitating language translators.

Figure 6:
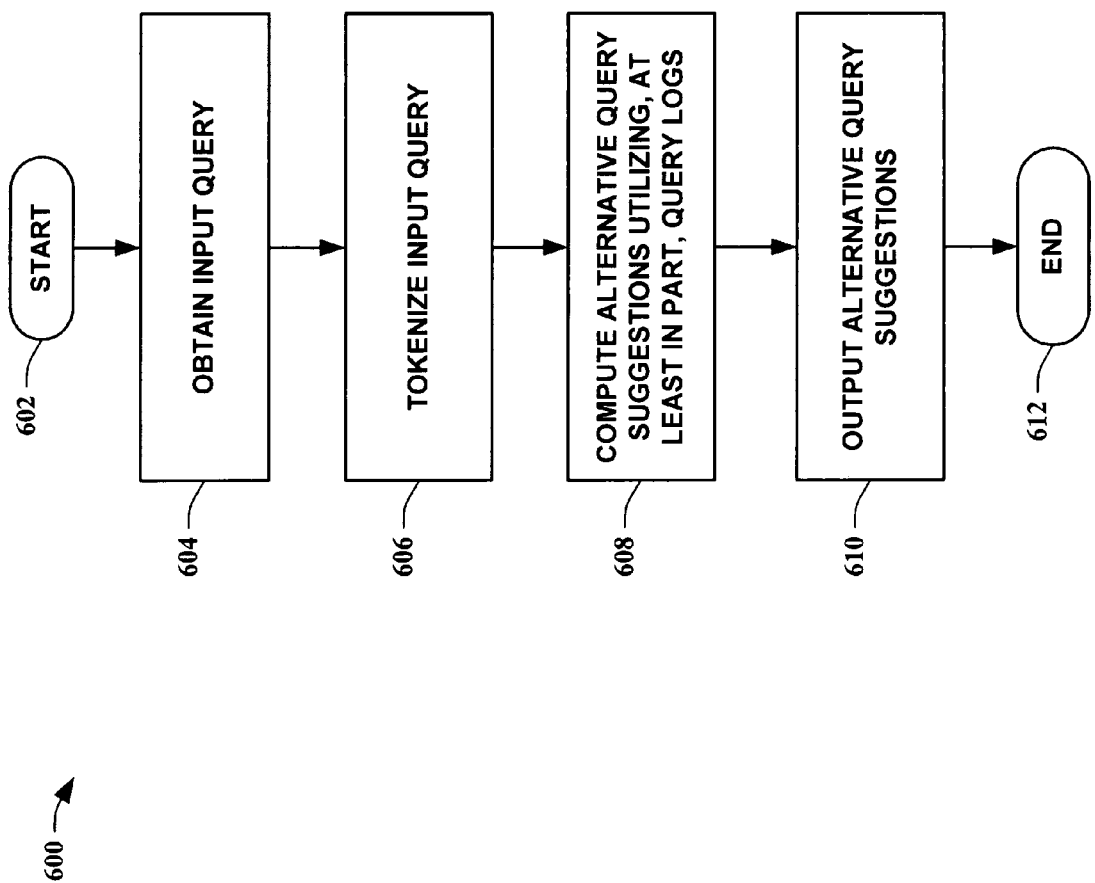
FIG. 6 is a flow diagram of a method of facilitating search queries in accordance with an aspect of the present invention.
Figure 7:
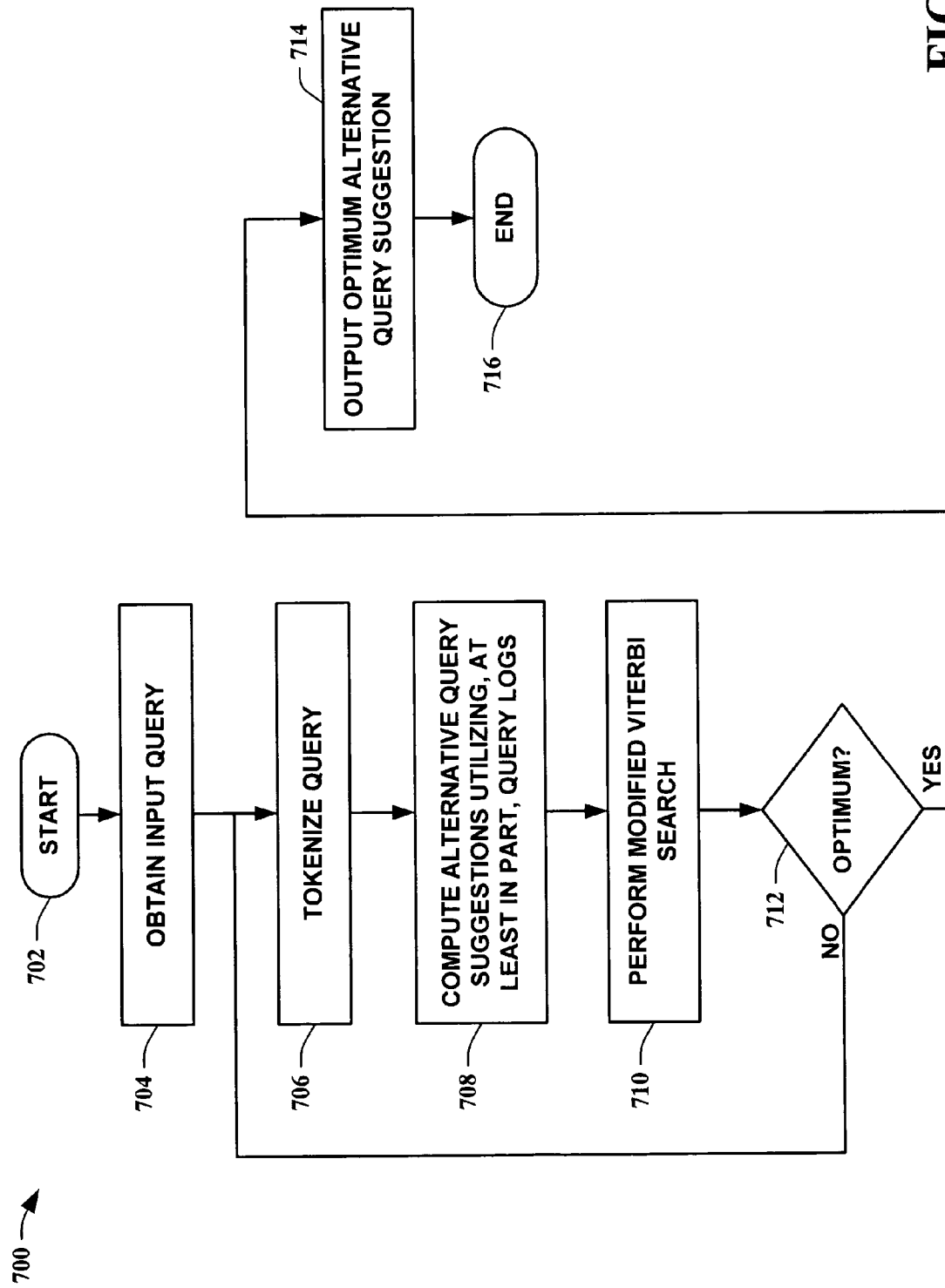
FIG. 7 is another flow diagram of a method of facilitating search queries in accordance with an aspect of the present invention.
Figure 8:
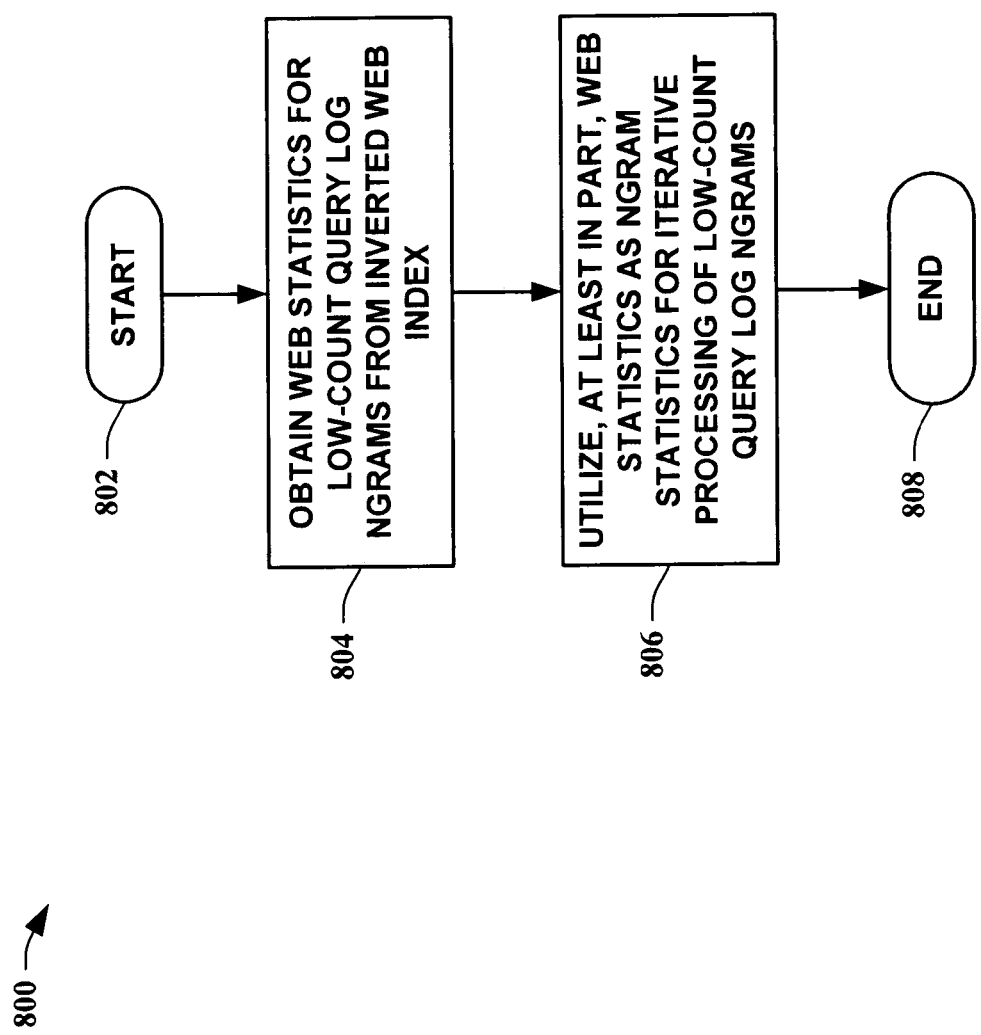
FIG. 8 is yet another flow diagram of a method of facilitating search queries in accordance with an aspect of the present invention.

In view of the exemplary systems and processes shown and described above, methodologies that may be implemented in accordance with the present invention will be better appreciated with reference to the flow charts of FIGS. 6-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 6, a flow diagram of a method 600 of facilitating search queries in accordance with an aspect of the present invention is shown. The method 600 starts 602 by obtaining an input search query 604. The query is typically input by a user into a web search application. The search query is then tokenized by the present invention to break it down into bigrams and unigrams for processing 606. The tokenized query is then utilized to compute an alternative query suggestion employing, at least in part, at least orne query log 608. The query log provides, at least in part, statistical information relating to prior searches conducted by users. Such statistical information as frequency and/or corrective suggestions and the like can be employed by the present invention to provide the alternative query suggestion. In other instances of the present invention, a trusted lexicon can also be utilized along with additional web statistics to improve low-count word n-grams. Web statistics can also be employed without the lexicon information as well. The present invention can also utilize a modified context-dependent weighted Levenshtein distance which allows insertion, deletion, substitution, immediate transposition, and long-distance movement of letters and the like as point changes. During computation of the alternate query suggestion, the present invention can also employ a constraint that no two adjacent in-vocabulary words are allowed to change simultaneously. An algorithmic consequence of this constraint is that there is no need to search all the possible paths in a trellis, which makes the modified search procedure substantially faster. Additionally, it prevents a query from becoming a totally erroneous phrase for an alternate query suggestion. Once the alternative query suggestion is computed, it is output to a user and/or system 610, ending the flow 612.

Referring to FIG. 7, another flow diagram of a method 700 of facilitating search queries in accordance with an aspect of the present invention is depicted. The method 700 starts 702 by obtaining an input search query 704. The input query is then tokenized utilizing the same space and word-delimiter information in addition to available lexical information as utilized for processing a query log 706. For each token, a set of alternatives is computed utilizing a weighted Levenshtein distance function and allowing different thresholds for in-lexicon words and out-of-lexicon tokens 708. The present invention contrasts with traditional spelling correction because the matches are searched in the space of word/token unigrams and bigrams extracted from query logs in addition to the lexicon. In one instance of the present invention, both unigrams and bigrams are stored in a same data structure, so that a system handles concatenation and splitting of words in exactly the same way it handles one-word unknown forms. Once the sets-of all possible alternatives are computed for each word form in the query, a modified Viterbi search (in which the transition probabilities are computed utilizing bigram and unigram query-log statistics and output probabilities are replaced with inverse distances between words) is employed to find the best possible alternative string to the input query under the following constraint: no two adjacent in-vocabulary words are allowed to change simultaneously 710. An algorithmic consequence of this constraint is that there is no need to search all the possible paths in a trellis, which makes the modified search procedure a lot faster, as described further. A determination is then made as to whether an optimum alternative query suggestion has been found 712. If yes, the optimum alternative query suggestion is output 714, ending the flow 716. If not, the best substring alternative query suggestion is tokenized again 706 in an iterative process until the optimum alternative query suggestion is found.

Looking at FIG. 8, yet another flow diagram of a method 800 of facilitating search queries in accordance with an aspect of the present invention is illustrated. The method 800 starts 802 by obtaining web statistics for low-count query log n-grams from an inverted web index 804. This enhances the statistical information for the n-gram by incorporating information from a much larger data base. The web statistics are then utilized, at least in part, as the statistics for the n-gram for iterative processing of low-count query log n-grams 806, ending the flow 808. In one instance of the present invention, word unigrams and bigrams that appear in the query logs are employed, but have their query-log frequencies adjusted according to their web frequencies. In this way, very low frequency n-grams can be filtered out from the query log that do not occur on the web (this can be done to limit the size of the data utilized at runtime), but do not lose higher frequency query misspellings that are useful for iterative correction, while obtaining more reliable word n-gram statistics.

Figure 9:
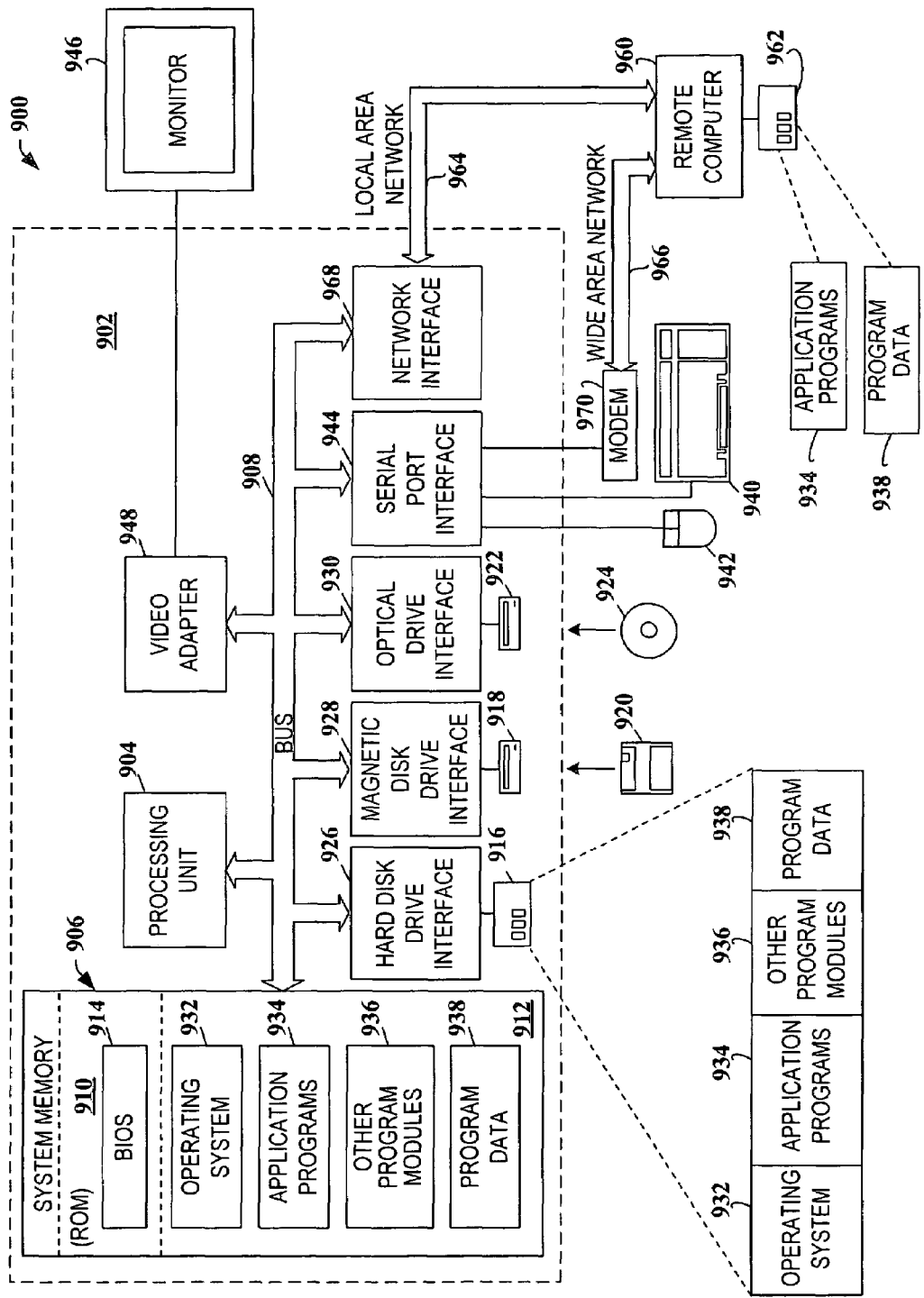
FIG. 9 illustrates an example operating environment in which the present invention can function.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus utilizing any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a search query spell checking scheme in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment utilizing logical connections to one or more remote computers 960. The remote computer 960 may be a workstation, a server computer, a router, a peer device or other common network node, and typically includes many or all of the elements described relative to the computer 902, although, for purposes of brevity, only a memory storage device 962 is illustrated in FIG. 9. The logical connections depicted in FIG. 9 can include a local area network (LAN) 964 and a wide area network (WAN)

966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary, and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
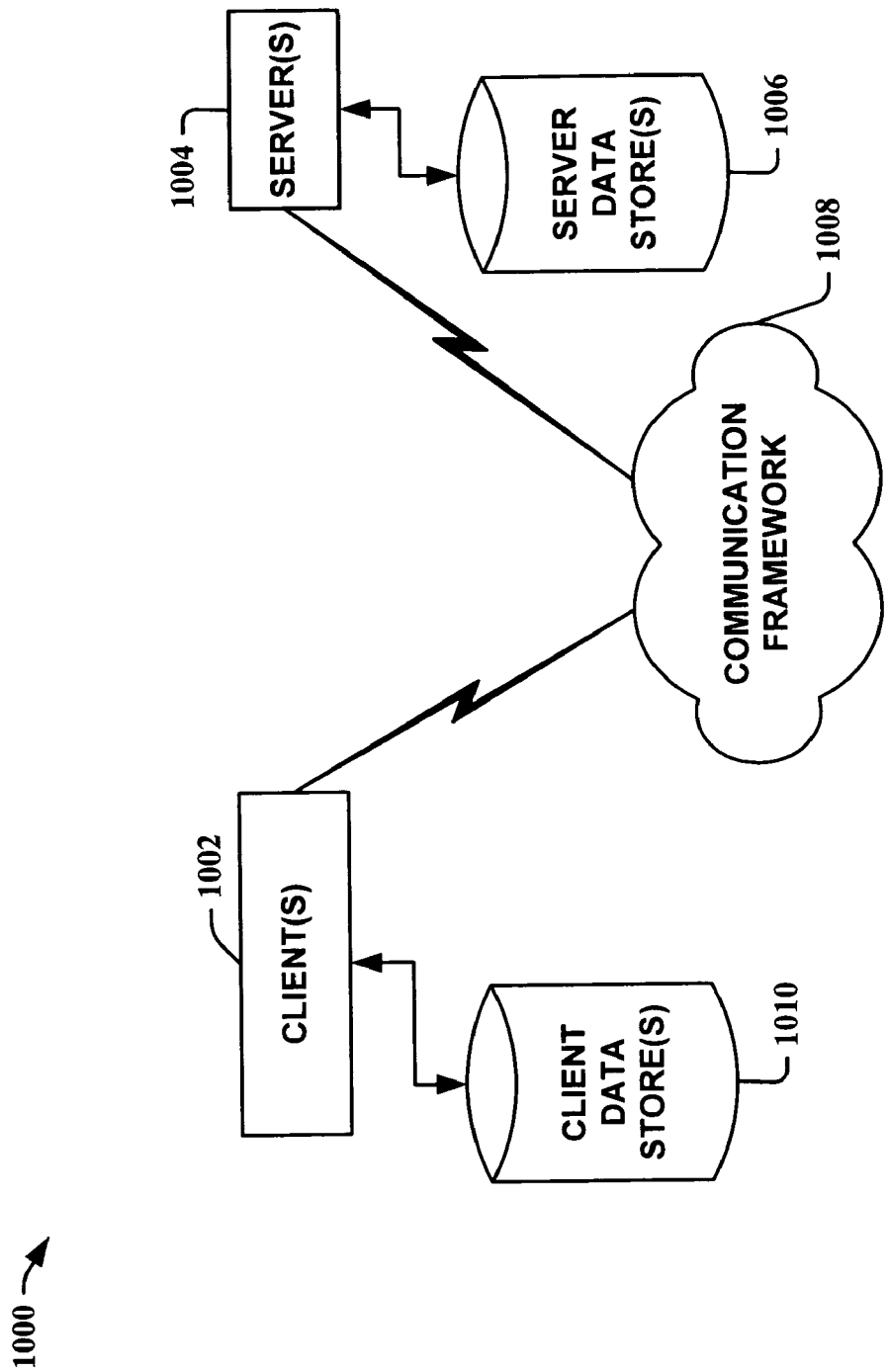
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The server(s) 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the present invention, a data packet transmitted between two or more computer components that facilitates search query spell checking is comprised of, at least in part, information relating to a search query spell checking system that provides, at least in part, at least one alternative spelling for a query string set based on at least one query log.

It is to be appreciated that the systems and/or methods of the present invention can be utilized in search query spell checking facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising a computer readable storage having computer readable instructions stored thereon, when executed causes a computer to facilitate spell checking comprising:

a component that receives input data containing text; and a spell checking component that identifies a set of potentially misspelled substrings in the text and proposes at least one alternative spelling for the substring set based on at least one query log; the query log comprising data utilized by users to query a data collection over a time frame, the spell checking component employs an iterative process where alternative spellings for potentially misspelled stop words in the substring are identified in an iteration after the iteration where alternative spellings for potentially misspelled words that are not stop words in the same substring are identified, wherein a Viterbi search is employed to facilitate in determining the optimum set of alternative spellings according to the context model in each iteration; the Viterbi search can employ fringes to restrict a search for alternative spellings in an iteration such that for every pair of adjacent substrings, if any of the substrings is in at least one trusted lexicon, then only one of the substrings is allowed to change in that iteration.

2. The system of claim 1, the spell checking component further utilizes user-dependent information in proposing at least one alternative spelling.

3. The system of claim 1, the alternative spelling for the substring set is further based on at least one trusted lexicon.

4. The system of claim 3, the spell checking component further employs a list of stop words.

5. The system of claim 4, the list of stop words containing high frequency words and function words and their frequent misspellings.

6. The system of claim 4, the spell checking component employs an iterative process to search a space of alternative spellings.

7. The system of claim 6, the spell checking component employs, at least in part, heuristics to impose restrictions on a search space utilized to determine a proposed alternative spelling.

8. The system of claim 7, the heuristics utilize, at least in part, at least one fringe to limit the search space.

9. The system of claim 4, the query log comprising a histogram of queries asked over a time frame.

10. The system of claim 9, the histogram of asked queries relates to a subset of the users; the subset comprising at least one user.

11. The system of claim 9, the query log resides on a server computer.

12. The system of claim 9, the query log resides on a client computer.

13. The system of claim 1, a substring comprising at least one selected from a group consisting of an entry in at least one trusted lexicon, an entry in a stop word list, and a sequence of characters without a pre-defined set of delimiter characters.

14. The system of claim 1, a substring bigram comprising a pair of substrings in a text.

15. The system of claim 14, the substring bigram comprising a pair of adjacent substrings in a text.

16. The system of claim 1, the spell checking component utilizes substring occurrence and co-occurrence statistics from the at least one query log, the substring co-occurrence statistics comprising substring bigram counts with stop-word-sequence-skipping counts, the substring occurrence and co-occurrence statistics from the query log are stored in a same searchable data structure.

17. The system of claim 16, the data structure comprising a trie.

18. The system of claim 17, handles concatenated and/or split substrings in a same manner as it handles individual substrings.

19. The system of claim 18, the spell checking component generates a set of alternative spellings that are substrings in at least one selected from the group consisting of at least one query log and at least one lexicon.

20. The system of claim 19, the set of alternative spellings comprising a set of alternative spellings determined via an iterative correction process.

21. The system of claim 20, the iterative correction process comprising a plurality of iterations that change at least one substring to another substring as an alternative spelling; the iterative correction process halts when all possible alternative spellings are less appropriate than a current set of alternative spellings.

22. The system of claim 21, the alternative spellings and their appropriateness are computed based on a probabilistic string distance and a statistical context model.

23. The system of claim 22, the probabilistic string distance comprising a modified context-dependent weighted Damerau-Levenshtein edit function that allows insertion, deletion, substitution, transposition, and long-distance movement of characters as point changes.

24. The system of claim 22, in each iteration, the set of alternative spellings for a substring is generated utilizing a searchable substring data structure extracted from at least one query log and at least one trusted lexicon.

25. The system of claim 24, in each iteration, the set of alternative spellings for each substring is restricted to within a probabilistic distance δ from an input substring; the restriction is imposed within each iteration without limiting the iterative correction process as a whole.

26. The system of claim 25, in each iteration, the iterative correction process searches for an optimum set of alternative spellings via utilization of a statistical context model.

27. The system of claim 26, the statistical context model comprising substring occurrence and co-occurrence statistics extracted from at least one query log.

28. The system of claim 27, a Viterbi search is employed to facilitate in determining the optimum set of alternative spellings according to the context model in each iteration.

29. The system of claim 28, the Viterbi search can employ fringes to restrict a search for alternative spellings in an iteration such that for every pair of adjacent substrings, if any of the substrings is in at least one trusted lexicon, then only one of the substrings is allowed to change in that iteration.

30. A method of facilitating spell checking, comprising:
receiving input data containing text;
identifying a set of potentially misspelled substrings in the text; generating a set of alternative spellings that are substrings in at least one selected from the group consisting of at least one query log comprising data utilized by users to query a data collection over a time frame and at least one lexicon, the set of alternative spellings comprising a set of alternative spellings determined via an iterative correction process that includes searching for an optimum set of alternative spellings via utilization of a statistical context model; the statistical context model comprising substring occurrence and co-occurrence statistics extracted from the at least one query log, the iterative correction process includes identifying alternative spellings for potentially misspelled stop words in the substrings in an iteration after an iteration identifying alternative spellings for potentially misspelled words that are not stop words in the same substrings;
employing a Viterbi search to facilitate in determining the optimum set of alternative spellings according to the context model in each iteration; the Viterbi search can employ fringes to restrict a search for alternative spellings in an iteration such that for every pair of adjacent substrings, if any of the substrings is in at least one trusted lexicon, then only one of the substrings is allowed to change in that iteration; and
proposing at least one alternative spelling for the substring set.

31. The method of claim 30, further comprising:
employing, at least in part, a list of stop words to facilitate in determining at least one alternative spelling;
utilizing substring occurrence and co-occurrence statistics from at least one query log; the query log comprising a histogram of queries asked over a time frame and the substring occurrence and co-occurrence statistics from the query log are stored in a same searchable data structure; and
handling concatenated and/or split substrings in a same manner as handling individual substrings.

32. The method of claim 31, the iterative correction process comprising:
changing at least one substring to another substring as an alternative spelling; and
halting the iterative correction process when all possible alternative spellings are less appropriate than a current set of alternative spellings; the alternative spellings and their appropriateness are computed based on a probabilistic string distance and a statistical context model.

33. The method of claim 32, further comprising in each iteration of the iterative correction process:
utilizing a searchable substring data structure extracted from at least one query log and at least one trusted lexicon to generate the set of alternative spellings for a substring; and
restricting the set of alternative spellings for each substring to within a probabilistic distance δ from an input substring; the restriction being imposed within each iteration without limiting the iterative correction process as a whole.

34. A system comprising a computer readable storage having computer readable instructions stored thereon, when executed causes a computer to facilitate spell checking queries to a search engine comprising:
means for receiving input data containing text; and
means for identifying a set of potentially misspelled substrings in the text and proposing at least one alternative spelling for the substring set based on at least one query log; the query log comprising data utilized by users to query a data collection over a time frame, the means employing an iterative process that identifies alternative spellings for potentially misspelled stop words in the substrings in an iteration after an iteration identifies alternative spellings for potentially misspelled words that are not stop words in the same substrings, and the means employing a Viterbi search to facilitate in determining the optimum set of alternative spellings according to the context model in each iteration; the Viterbi search can employ fringes to restrict a search for alternative spellings in an iteration such that for every pair of adjacent substrings, if any of the substrings is in at least one trusted lexicon, then only one of the substrings is allowed to change in that iteration.

35. A device employing the method of claim 30 comprising at least one of a computer, a server, and a handheld electronic device.

36. A device employing the system of claim 1 comprising at least one a computer, a server, and a handheld electronic device.

* * * * *